(12) United States Patent
Wallek

(10) Patent No.: US 7,752,944 B2
(45) Date of Patent: Jul. 13, 2010

(54) MULTI-USE EXPANSION ANCHOR AND SYSTEM FOR SETTING THE SAME

(76) Inventor: Thomas Allan Wallek, 1465 Rainna Ct., Reno, NV (US) 89509

( * ) Notice: Subject to any disclaimer, the term of this patent is extended or adjusted under 35 U.S.C. 154(b) by 17 days.

(21) Appl. No.: 12/009,177

(22) Filed: Jan. 17, 2008

(65) Prior Publication Data

US 2008/0175686 A1    Jul. 24, 2008

Related U.S. Application Data

(60) Provisional application No. 60/881,648, filed on Jan. 22, 2007.

(51) Int. Cl.
*B25D 1/16*    (2006.01)
*F16B 13/06*   (2006.01)

(52) U.S. Cl. ............ 81/27; 411/44; 81/44; 81/463

(58) Field of Classification Search ......... 81/20, 81/23, 27, 44, 463, 464; 173/90, 91; 411/44, 411/50, 53

See application file for complete search history.

(56) References Cited

U.S. PATENT DOCUMENTS

| | | | | |
|---|---|---|---|---|
| 3,958,488 A * | 5/1976 | Fischer | ........... | 411/44 |
| 4,364,440 A * | 12/1982 | Clar | ........... | 173/93.7 |
| 4,475,329 A * | 10/1984 | Fischer | ........... | 411/44 |
| 4,675,968 A * | 6/1987 | Bartlett | ........... | 29/254 |
| 4,785,692 A * | 11/1988 | Holmes | ........... | 81/27 |
| 4,943,195 A * | 7/1990 | Fischer | ........... | 411/55 |
| 5,088,174 A * | 2/1992 | Hull et al. | ........... | 29/254 |
| 5,694,672 A * | 12/1997 | Perin | ........... | 29/426.5 |
| 5,875,534 A * | 3/1999 | Jackson | ........... | 29/255 |
| 6,226,948 B1 * | 5/2001 | Trout | ........... | 52/514.5 |

\* cited by examiner

*Primary Examiner*—Hadi Shakeri

(57) ABSTRACT

Objects of the present invention provide a multi-use anchor and system for setting the same. One embodiment of the present invention is directed to a multi-use anchor including a bolt, an elastomeric sleeve fitting over a threaded portion of the bolt, and a receiver arranged to couple to the bolt, where tightening the receiver on the bolt compresses the elastomeric sleeve such that the sleeve radially expands to engage a hole in rigid substrate material.

8 Claims, 4 Drawing Sheets

MULTI-USE EXPANSION ANCHOR AND SYSTEM FOR SETTING THE SAME

CROSS-REFERENCE TO RELATED APPLICATIONS

This U.S. non-provisional patent application claims priority to U.S. provisional application No. 60/881,648 filed on Jan. 22, 2007, the entire contents of which are hereby incorporated by reference.

FIELD OF INVENTION

This invention relates to a multi-use expansion anchor and a system for setting the same. More specifically, this invention relates a multi-use expansion anchor settable in a rigid substrate and a setting system for placing and setting the multi-use expansion anchor in the rigid substrate.

BACKGROUND

Expansible bolt anchoring devices are widely used in the construction industry for attaching articles to rigid structures constructed of, for example, concrete, masonry, or brick. These rigid structures may include walls, ceilings, floors, and the like made of such rigid substrate materials as mentioned above. A conventional expansible type anchor device typically includes a segmented expansible sleeve, an expansion bolt, and an expansion member. The expansion member may be in the form of a nut on the bolt (such as in a "loose bolt" anchor) or may form the head of the bolt (such as in a "projecting bolt" anchor). The expansion member is initially positioned at the inner end of the segmented shell such that rotation of the bolt, or rotation of a nut on the shank of the bolt, will draw the expansion bolt into the sleeve and radially expand the sleeve. Thus, when the device is located in a hole having a diameter substantially similar to the diameter of the segmented sleeve, tightening the bolt or nut expands the sleeve radially to engage the walls of the hole.

To prevent the bolt from simply spinning in the hole, and hence actually tightening the bolt or nut in the hole, it is required that a portion of the sleeve engage the hole wall to restrict the rotational movement of the anchor within the hole. This requires that the sleeve have a snug fit in the hole, which is often difficult to achieve because of various manufacturing tolerances in the bolts and inexact hole diameters from drilling. In the absence of such a close fit, the sleeve must be held or constrained in the hole by some other means, such as filling the hole with some type of packing material.

The three or four segments that typically form the sleeve of conventional expansible anchors are formed of pressed metal. An example of this type of anchor can be seen in U.S. Pat. No. 4,656,806 (the '806 patent). The bolt taught in the '806 patent has a cone shape on one end such that when the nut is tightened, the sleeve is forced over the cone, which in turn creates radial pressure on the wall of the hole. However, because the sleeve of this bolt tends to engage the wall at a single point of contact, a large amount of pressure is exerted on the single point of contact, which often leads to a crushing effect occurring to the rigid substrate material. Further, because these rigid substrate materials are frequently softer than the metal of the expansible sleeve, the crushing effect continues as the expansion member is further tightened leading to large-scale failures. These failures are particularly dangerous because the bolt may initially appear to be secure if the crushing happens below the outside surface of the material, and the anchor may fail only after a large force is later exerted on it.

Expandable anchor failure in these rigid materials may pose an even greater problem when they are used in tensile zones subject to fracture, such as joints where bricks or blocks are mortared together.

Several devices using resilient sleeves have been proposed to help overcome the crushing problem in masonry and brick applications, such as in U.S. Pat. Nos. 4,472,008 and 6,273,655. However, these devices are overly complex and expensive to manufacture. Further, they are difficult to place and set, and they can be almost impossible to remove for later use. Consequently, they have not been adopted by the construction industry. These and other problems in the conventional art are addressed by embodiments of the present invention.

SUMMARY

Embodiments of the present invention provide a multi-use expansion anchor and a system for setting the same. In one embodiment, a multi-use expansion anchor includes a bolt having a substantially circular bolt head and a threaded portion extending from the bolt head, an elastomeric sleeve having an outside diameter substantially equal to the diameter of the bolt head and having an inner diameter substantially equal to the diameter of the bolt threads; and a receiver including a first portion having a diameter substantially equal to the diameter of the bolt head, a second portion having a retaining flange, a third portion having a hex shaped outer surface, and an inner portion traveling through the first, second, and third portions, where the inner portion includes threads corresponding to the threaded portion of the bolt.

BRIEF DESCRIPTION OF DRAWINGS

These and other features and advantages of the present invention are best understood by reading the following detailed description, taken together with the drawings wherein.

DETAILED DESCRIPTION

Figure 1:
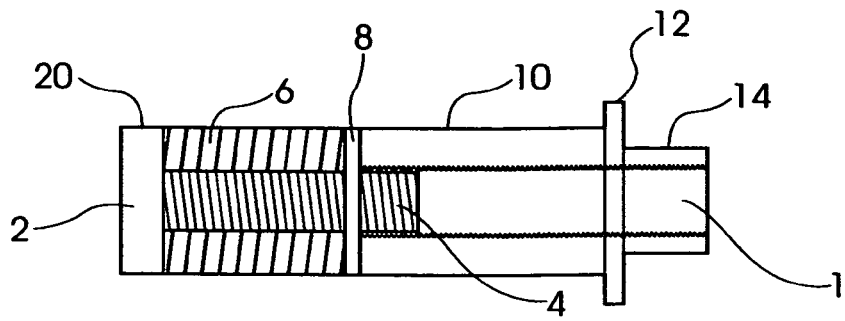
FIG. 1 is a partial cross-sectional view of a multi-use expansion anchor according to an embodiment of the present invention.

To address these and other problems, embodiments of the present invention are directed to a to a multi-use expansion anchor settable in a rigid substrate and a setting system for placing and setting the multi-use expansion anchor in the rigid substrate. Some of these embodiments are described below in detail, and in addition, some specific details are shown for purposes of illustrating the inventive principles. However, numerous other arrangements may be devised in accordance with the inventive principles of this patent disclosure. Thus, while the present invention is described in conjunction with the specific embodiments illustrated in the drawings, it is not limited to these embodiments or drawings. Rather, it is intended to cover alternatives, modifications, and equivalents that come within the scope and spirit of the inventive principles set out in the appended claims. Further, well-known processes have not been described in detail in order not to obscure the present invention. Thus, the inventive principles are not limited to the specific details disclosed herein.

According to one embodiment of the present invention, there is provided an anchoring device comprising: an elastomeric sleeve for receiving a threaded elongate member, an elongated member, a washer, and a receiver that is threaded for receiving the installation tool. According to another embodiment of the present invention, there is provided an installation tool comprising a threaded rod, a hexagonal connecting nut, a threaded rod with a stopper on one end, and a slide hammer that rides on the threaded rod with stopper.

The anchoring device may be installed into a concrete, masonry, brick, or stone structure, such as a wall, by drilling a hole at the desired location using a rotary-hammer drill with a drill bit corresponding to the diameter of the receiver of this invention. The anchor receiver is then partially tightened to compress the elastomeric sleeve until it snugly fits inside the drilled hole. This may be accomplished by manually turning the bolt and receiver towards each other to compress the sleeve and then sliding it into the hole. When light friction is experienced in this manual insertion, the sleeve can be fully inserted into the hole using the installation tool. This may require lightly tapping the slide hammer while inserting the anchor into the hole. When the anchor is installed in the hole properly, the hexagonal head of the receiver may be turned in a tightening direction, usually clockwise, which exerts radial pressure on the wall of the hole by compressing the elastomeric sleeve. Tightening continues until adequate radial pressure has been applied to the sleeve to assure the anchor will not slip. Significant resistance is experienced at this point and further compressing the sleeve by turning the receiver is not required. Rotating the receiver in the opposite direction decreases the radial pressure on the wall and releases the sleeve from contact with the wall. When the receiver has been rotated to its original insertion position, the anchoring device can easily be removed with the installation tool by hammering in the outward position away from the installation location. The anchoring device can then be re-used many times until the elastomeric sleeve has been distorted or damaged and slipping is encountered. When this occurs, the elastomeric sleeve can be replaced and the anchoring device can be again used without slippage. This process of replacing the sleeve when it has been worn or damaged can continue indefinitely, thus allowing this expansion anchor to be used multiple times without the need to replace the entire anchor.

When the anchor has been installed properly and the installation tool has been detached from the anchor, bolts and threaded rods can be used to attach various devices or equipment to the masonry or brick wall. These devices can then be removed after completion of the assigned task. The anchor can also be removed from the wall and reused. This invention is particularly useful in applications where repetitive anchoring of equipment to masonry walls for temporary installation of equipment is required such as with concrete cutting equipment, electrical cable pullers, or elevator equipment installation.

The elastomeric sleeve included in this expandable bolt is a simple extruded elastomeric material that has a diameter substantially equal to the diameter of the hole drilled in the rigid substrate material to receive the anchor. The sleeve also has a hole through its center that the bolt can project through to attach to the receiver. In one embodiment, there is a washer between the sleeve and the receiver that allows the receiver to be rotated freely when tightening the elastomeric sleeve so as to increase radial pressure on the walls of hole.

Figure 2:
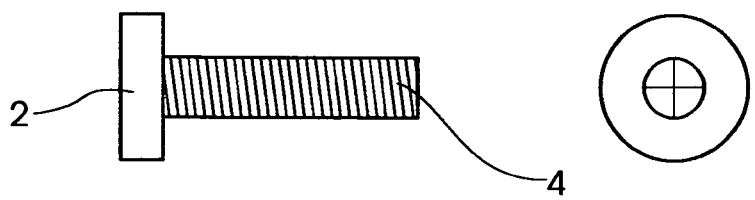
FIG. 2 is a partial cross-sectional view of the bolt portion of the multi-use expansion anchor illustrated in FIG. 1.
Figure 3:
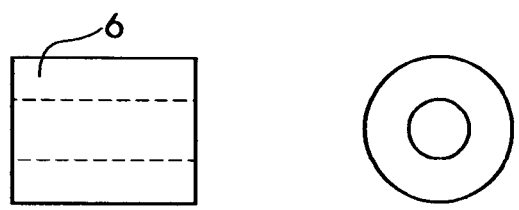
FIG. 3 is a partial cross-sectional view of the elastomeric sleeve portion of the multi-use expansion anchor illustrated in FIG. 1.
Figure 4:
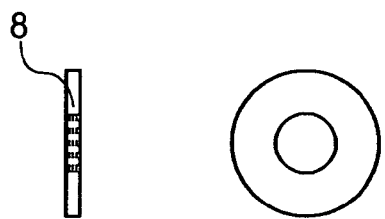
FIG. 4 is a partial cross-sectional view of the washer portion of the multi-use expansion anchor illustrated in FIG. 1.
Figure 5:
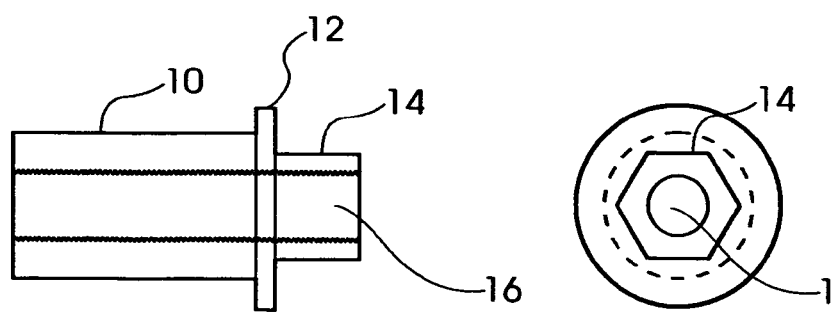
FIG. 5 is a partial cross-sectional view of the receiver portion of the multi-use expansion anchor illustrated in FIG. 1.

FIGS. 1-5 illustrate a multi-use expansion anchor according to an embodiment of the present invention. FIG. 1 is a partial cross-sectional view of the assembled multi-use expansion anchor; FIG. 2 is a partial cross-sectional view of the bolt portion of the multi-use expansion anchor; FIG. 3 is a partial cross-sectional view of the elastomeric sleeve portion of the multi-use expansion anchor; FIG. 4 is a partial cross-sectional view of the washer portion of the multi-use expansion anchor; and FIG. 5 is a partial cross-sectional view of the receiver portion of the multi-use expansion anchor.

Figure 9:
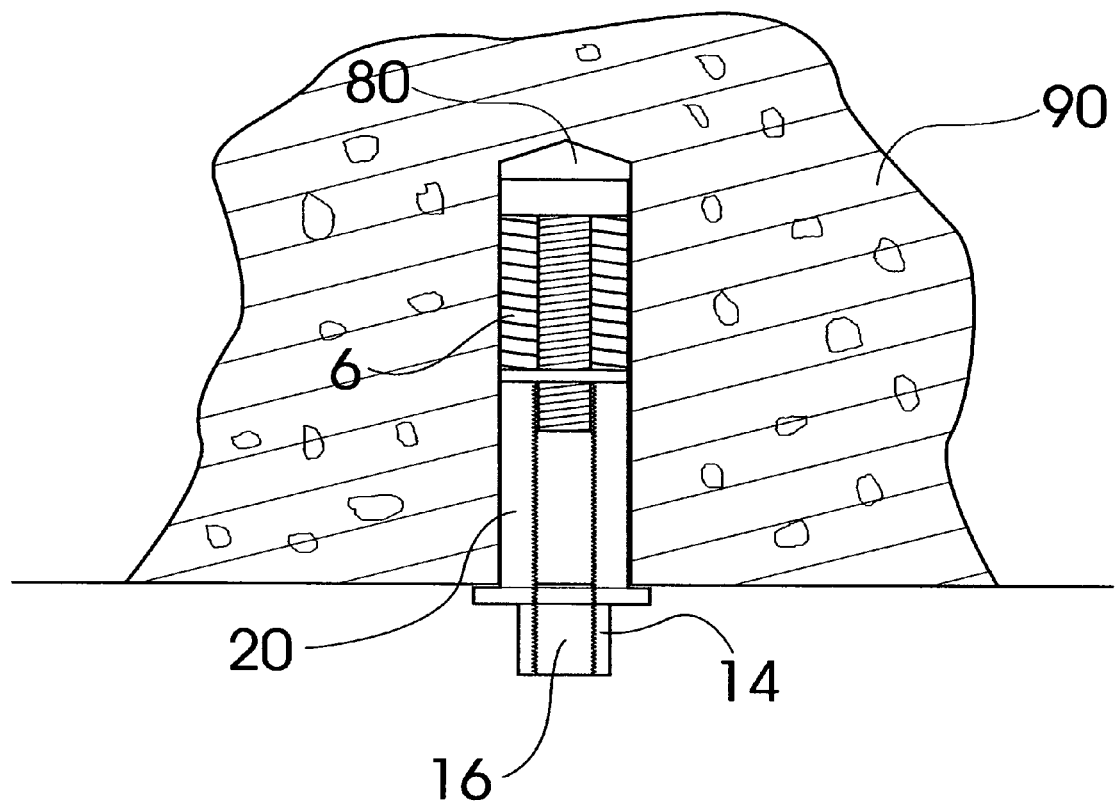
FIG. 9 is a partial cross-sectional view of the multi-use expansion anchor illustrated in FIG. 1 as installed in the substrate.

Referring to FIGS. 1-5, the multi-use expansion anchor 20 is used to attach various devices to a structure constructed of a rigid substrate material 90, such as concrete, masonry, stone, or brick (as shown in FIG. 9).

The multi-use expansion anchor 20 includes a threaded bolt 2, an elastomeric sleeve 6 that the threaded bolt 2 passes through longitudinally, a washer 8 that the threaded bolt passes through longitudinally, and a receiver 10 that the threaded bolt 2 is threaded into and tightened to create the compression of the elastomeric sleeve 6 that holds the device in the rigid substrate material. The threaded bolt 2 includes a bolt head portion that is substantially circular and a threaded portion 4 extending from the bolt head. The elastomeric sleeve 6 may have an outer diameter that is substantially equal to the diameter of the bolt head. The elastomeric sleeve 6 may further include an inner passageway that corresponds to the threaded portion 4 of the bolt 2. The elastomeric sleeve 6 may include a rubber material, a polymer material, or similar resilient materials. The washer 8 may have an outer diameter substantially similar in size to the diameter of the bolt head of the bolt 2. The washer 8 may also include a hole that is configured to allow the threaded portion 4 of the bolt 2 to pass through.

The receiver 10 includes a body portion that has an outer diameter substantially similar to the diameter of the bolt head of the bolt 2. The receiver 10 includes an inner portion 16 having threads corresponding to the threaded portion 4 of the bolt 2. The receiver 10 may also include a retaining flange 12 that keeps the anchor device 20 from withdrawing into the hole when it is tightened. The receiver 10 may further include a hex head 14 that protrudes out from the retaining flange 12. The hex head 14 may be engaged by a wrench, socket, or other tool to rotate the receiver 10. The entire inner portion 16 of the receiver 10 may be threaded to allow the bolt 2 to couple to the receiver 10 at one end of the receiver 10 and allow attachment of various devices to the other end of the receiver 10 when it is properly installed.

Figure 6:
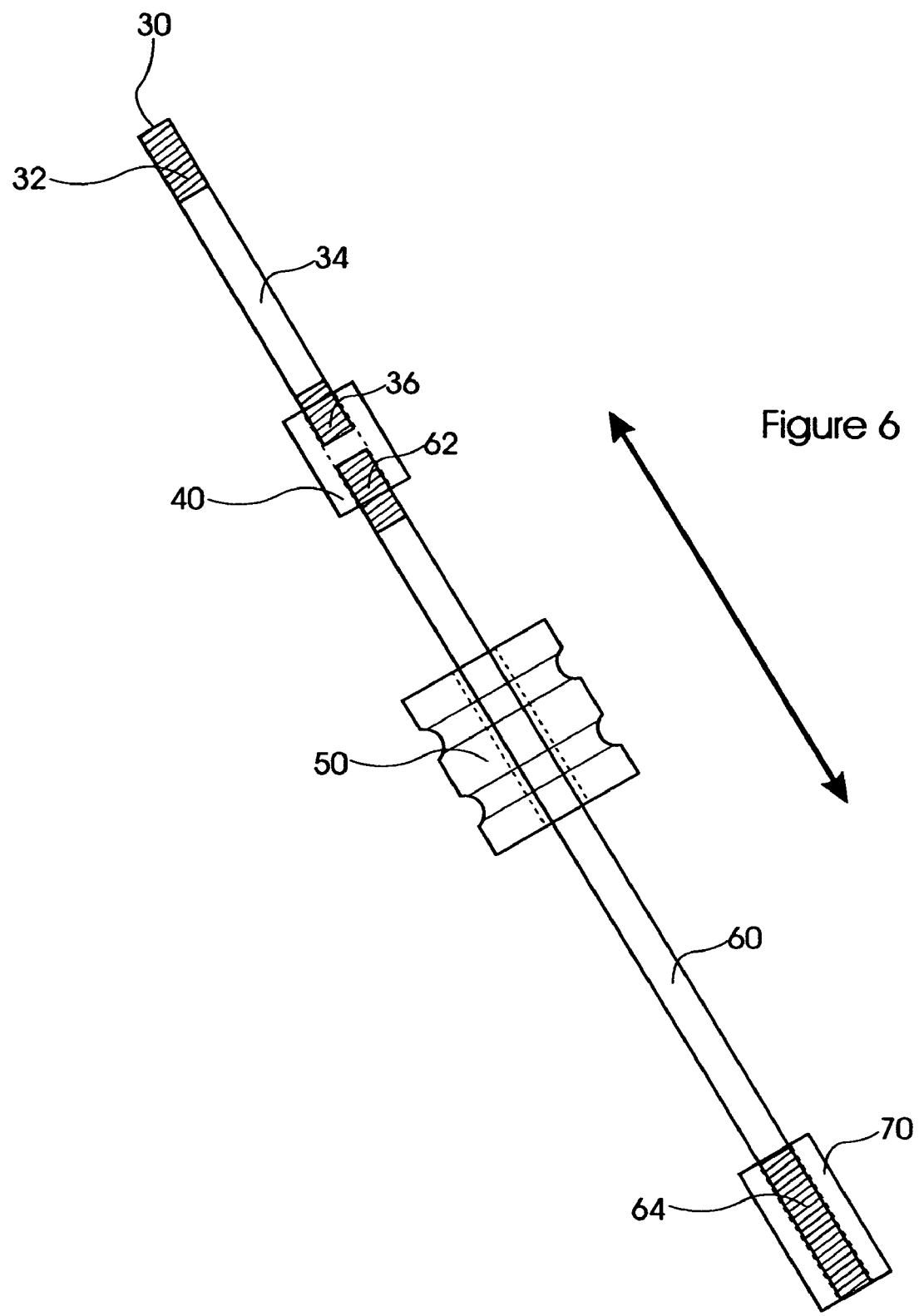
FIG. 6 is a partial cross-sectional view of an installation/removal tool for a multi-use expansion anchor according to an embodiment of the present invention

FIG. 6 is a partial cross-sectional view of an installation/removal tool for a multi-use expansion anchor according to an embodiment of the present invention.

Referring to FIG. 6, the installation/removal tool 30 includes a threaded rod 34 that is attached to the multi-use expansion anchor device 20 (shown in FIGS. 1 and 7) during installation and removal. The threaded rod 34 is connected to the hammer-in nut 40 at location 36. The hammer-in nut 40 is connected to the slide hammer rod 60. On the slide hammer rod 60, a slide hammer 50 is arranged to slide in either direction and strike the hammer-in nut 40 at location 62 or the hammer-out nut 70 at location 64. By striking the slide hammer 50 against the hammer-in nut 40, a multi-use expansion anchor 20 may be placed in a pre-drilled hole. Similarly, the slide hammer 50 may be struck against the hammer-out nut 70 to remove the multi-use expansion anchor 20 from the pre-drilled hole. The threaded rod 34 may further be removable from the hammer-in nut 40 so that different threaded rods 34 having different thread configurations may be used with the installation/removal tool 30. This may be advantageous in using the same installation/removal tool 30 with different sized or styled multi-use anchors. The slide hammer 50 may also include a locking mechanism (not shown) to lock the slide hammer 50 to the slide rod 60. In one embodiment, the locking mechanism may be a removable rubber gasket that is inserted in the space between the slide hammer 50 and the slide rod 60. This locking mechanism may prevent the slide hammer 50 from moving along the slide rod 60 during transportation or storage of the installation/removal tool 30.

Figure 7:
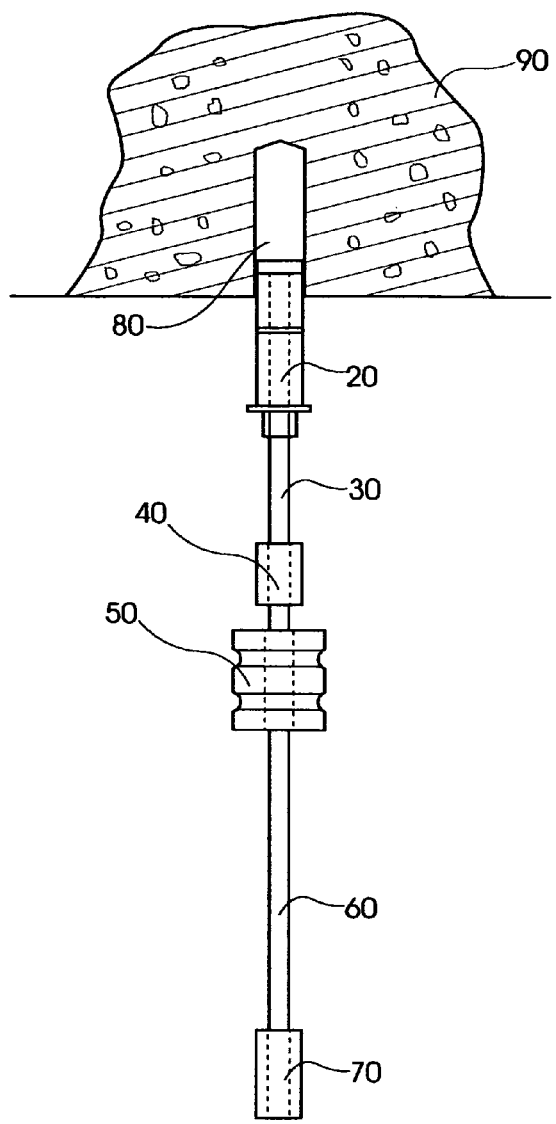
FIG. 7 is a partial cross-sectional view of a system for setting a multi-use expansion anchor according to an embodiment of the present invention.
Figure 8:
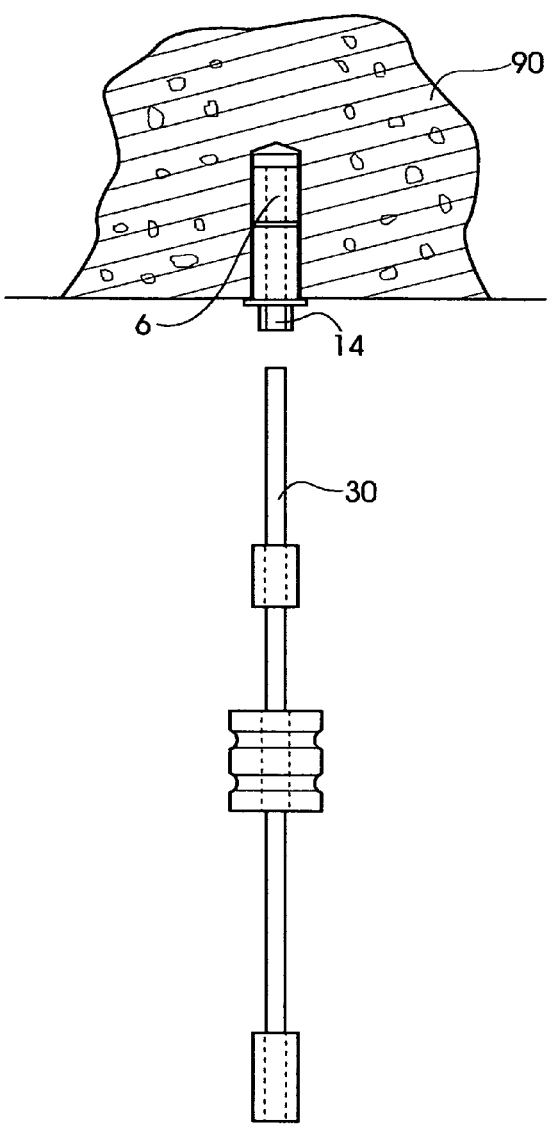
FIG. 8 is another partial cross-sectional view of the system for setting a multi-use expansion anchor.

FIGS. 7 and 8 are partial cross-sectional views of a system for setting a multi-use expansion anchor according to an embodiment of the present invention.

Referring to FIGS. 7 and 8, the multi-use expansion anchor device 20 may be installed in a pre-drilled hole 80 after the hole 80 has been drilled into a rigid substrate 90 with a rotary-hammer drill using a carbide drill bit or similar tool. Once the hole 80 has been drilled, the multi-use expansion anchor 20 can be installed into the rigid substrate 90 by attaching the anchor 20 to the installation/removal tool 30 (shown in detail in FIG. 6) by threading the receiver 10 of the multi-use expansion anchor 20 onto the threaded rod 34 of the installation/removal tool 30. The anchor 20 may be tightened slightly to compress the elastomeric sleeve 6 so that the surface of the sleeve 6 slightly contacts the walls of the hole 80. There should be just enough compression of the elastomeric sleeve 6 so that resistance is experienced when attempting to slide the anchor device into the hole without using the Installation/ Removal Tool 30. This allows the sleeve 6 to catch the wall of the hole 80 and not freely rotate when the hex head 14 of the multi-use expansion anchor 20 is turned. The anchor device 20 can now be fully inserted into the hole 80 in the substrate 90 as shown in FIG. 7. This is accomplished by sliding the slide hammer 50 against the hammer-in nut 40 until the anchor 20 is fully in the hole 80 such that the retaining flange 12 rests against the surface of the substrate 90.

When the anchor 20 is fully inserted into the hole 80, the installation/removal tool 30 can be detached from the multi-use expansion anchor 20, as shown in FIG. 8. At this time, the hex head 14 of the receiver 10 can be tightened until resistance is experienced in the tightening process. The resistance is a result of a pulling affect on the sleeve 6 when adequate radial pressure has been exerted on the hole wall 80. The bolt 2 is drawn towards the receiver 10 when the receiver 10 is tightened using the hex head 14. As the sleeve 6 is compressed, radial pressure against the hole wall 80 increases. This increased radial pressure causes the sleeve 6 to pull as it is compressed and can be felt when the hex head 14 of the receiver 10 is turned. When the re-useable anchor device has been fully installed and tightened properly, various equipment and tools can be temporarily attached to the anchor and then removed when the work is completed.

The removal process of the multi-use expansion anchor 20 is similar to the installation process with the steps reversed. That is, the radially pressure exerted by the elastomeric sleeve 6 on the walls of the hole 80 is reduced by turning the hex head 14 of the receiver 10 in a counter-clockwise direction, for example, such that the receiver 10 disengages from the threaded portion 4 of the bolt 2. After the anchor 20 has been loosened in the hole 80, the threaded rod 34 of the installation/removal tool 30 is inserted into the receiver 10 and the slide hammer 50 is struck against the hammer-out nut 70 to free the anchor 2 from the hole 80. The anchor 20 may then be removed from the installation/removal tool 30 and re-used when needed.

FIG. 9 is a partial cross-sectional view of the multi-use expansion anchor illustrated in FIG. 1 as installed in the substrate. Referring to FIG. 9, the elastomeric sleeve 6 of the multi-use expansion anchor 20 is longitudinally compressed and radially expanded to contact the walls of the hole 80. As this contact provides substantial friction without damaging the rigid substrate material 90, the anchor 20 may provide better protection than conventional metal expansion anchors. Further, because embodiments of the present invention are relatively simple and inexpensive, while still being re-usable, they are preferable over conventional anchors that employ elastomeric retaining mechanisms.

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention

What is claimed is:

1. A multi-use anchoring system, comprising:
   a multi-use anchor including:
      a bolt including a substantially circular head and a threaded portion,
      an elastomeric sleeve configured to be disposed over the threaded portion of the bolt, and
      a receiver including a connector end, an integrated flange, a body portion, and an internal threaded portion extending though the body portion, the integrated flange, and the connector end, wherein the internal threaded portion of the receiver corresponding to the body portion of the receiver is configured to attach to the threaded portion of the bolt, and wherein the connector end includes a multi-sided nut; and
   an installation/removal tool including:
      a threaded rod configured to attach to the internal threaded portion of the receiver corresponding to the connector end of the receiver,
      a hammer-in nut connected to the threaded rod,
      a slide hammer rod having a first end connected to the hammer-in nut,
      a hammer-out nut connected to a second end of the slide hammer rod, and
      a slide hammer configured to slide along the slide hammer rod between the hammer-in nut and the hammer-out nut.

2. The system of claim 1, wherein the installation/removal tool is configured to insert the multi-use anchor attached to the threaded rod in a pre-drilled hole by sliding the slide hammer against the hammer-in nut to push the anchor into the pre-drilled hole.

3. The system of claim 1, wherein the installation/removal tool is configured to remove the multi-use anchor from a pre-drilled hole by attaching the threaded rod to the connector end of the multi-use anchor and then sliding the slide hammer against the hammer-out nut to pull the anchor out of the pre-drilled hole.

4. The system of claim 1, wherein the threaded rod of the installation/removal tool can be removed from the hammer-in nut and replaced with another threaded rod having a different thread configuration.

5. A multi-use anchor, comprising:

a bolt including a substantially circular head and a threaded portion;

an elastomeric sleeve configured to be disposed over the threaded portion of the bolt; and a receiver including a connector end, a flange, and a body portion, wherein the body portion of the receiver is configured to attach to the threaded portion of the bolt, and wherein the flange is fixedly connected to the connector end and body portion, wherein the receiver further comprising an inner portion having receiving threads corresponding to the threaded portion of the bolt, wherein the inner portion of the receiver and the threads extend through the body portion, flange, and connector end, wherein the connector end of the receiver includes a multi-sided nut and the threaded inner portion disposed within the multi-sided nut, and a washer disposed over the bolt between the elastomeric sleeve and the receiver, allowing the receiver to be rotated freely relative to the elastomeric sleeve.

6. The anchor of claim 5, wherein a diameter of the bolt head is substantially similar in size to outer diameters of the elastomeric sleeve and body portion of the receiver.

7. The anchor of claim 6, wherein a diameter of the flange of the receiver is larger than the diameter of the body portion of the receiver.

8. The anchor of claim 5, wherein the flange of the receiver is disposed between the body portion and connector end of the receiver.

* * * * *